United States Patent [19]

Burton

[11] 4,263,142
[45] Apr. 21, 1981

[54] PROCESS AND SYSTEM FOR PURIFYING WATER

[75] Inventor: R. Edward Burton, Willits, Calif.

[73] Assignee: Microphor, Inc., Willits, Calif.

[21] Appl. No.: 48,019

[22] Filed: Jun. 13, 1979

[51] Int. Cl.³ .............................................. C02F 3/08
[52] U.S. Cl. .................................. 210/608; 210/615; 210/747; 210/150; 210/170; 210/242.1; 47/1.4
[58] Field of Search ................. 210/17, 150, 151, 170, 210/194, 195.1, 502, 505, 508, 13, 242 R, 200–202; 47/1.4

[56] References Cited

U.S. PATENT DOCUMENTS

| | | | |
|---|---|---|---|
| 3,238,124 | 3/1966 | Burton | 210/150 |
| 3,700,590 | 10/1972 | Burton | 210/150 |
| 4,086,161 | 4/1978 | Burton | 210/13 |
| 4,169,050 | 9/1979 | Serfling et al. | 210/150 |

Primary Examiner—Benoit Castel
Attorney, Agent, or Firm—Christie, Parker & Hale

[57] ABSTRACT

A process and system for reducing the biochemical oxygen demand and suspended solids levels of impure water and creating a wild life habitat. A number of containers are arranged in series with interconnecting lines through which the water flows. The containers include openings with clusters of bark fibers projecting through the same. The fibers serve to attract and hold nutrient deposition in the form of colloidal wastes and the like and as a safe habitat for microorganisms which feed on such wastes and as a capillary system for the passage of clarified water formed in the bark fibers. The containers are disposed underground. Roots from neighboring plants are attracted to the bark clusters and grow into the containers. In a preferred embodiment, the above container system is utilized as an advanced secondary treatment system for water previously treated in an open body of water in which a number of float units are secured carrying bark fibers which promote a trophic balance between minute animal feeders and excessive colloidal nutrient depositions in the water body.

18 Claims, 6 Drawing Figures

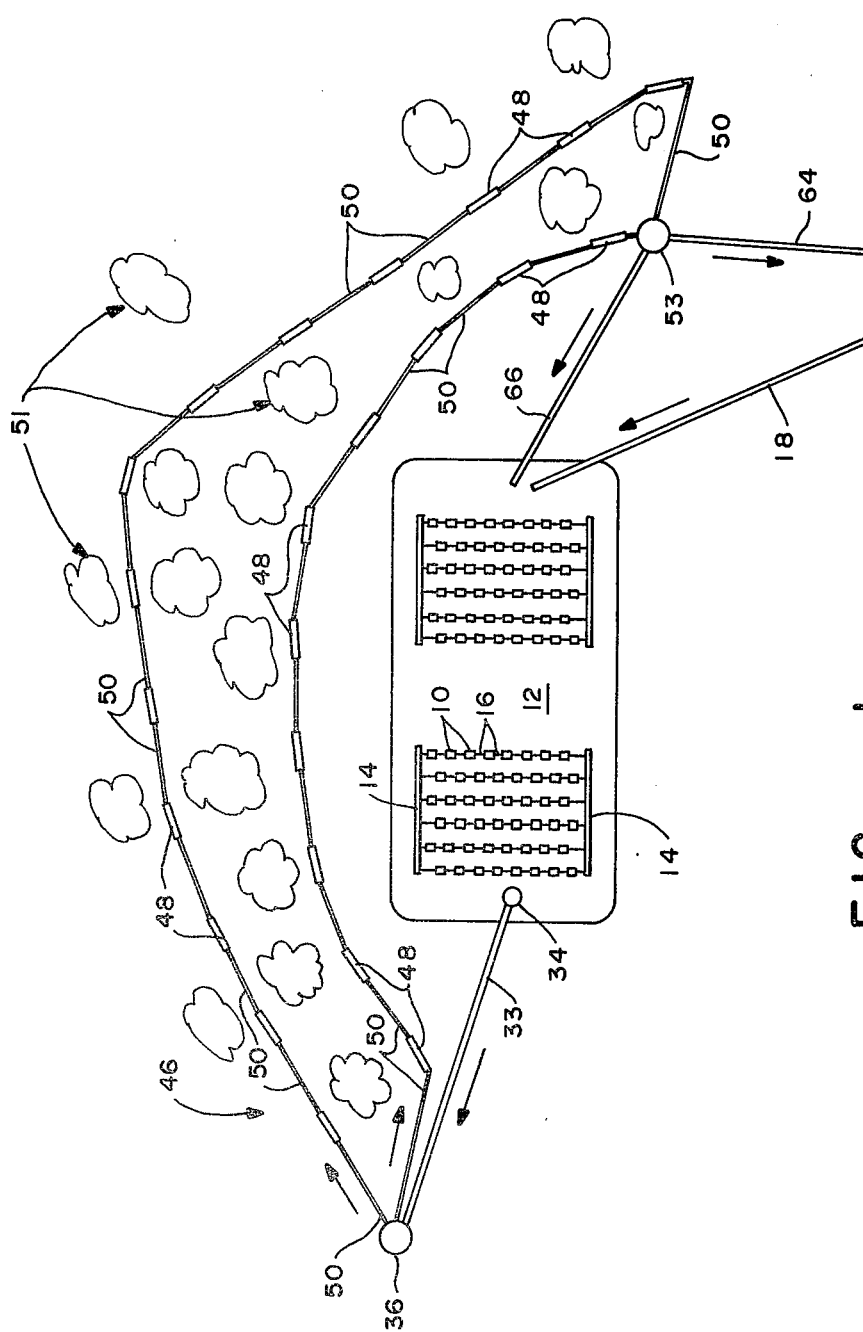
FIG.—1

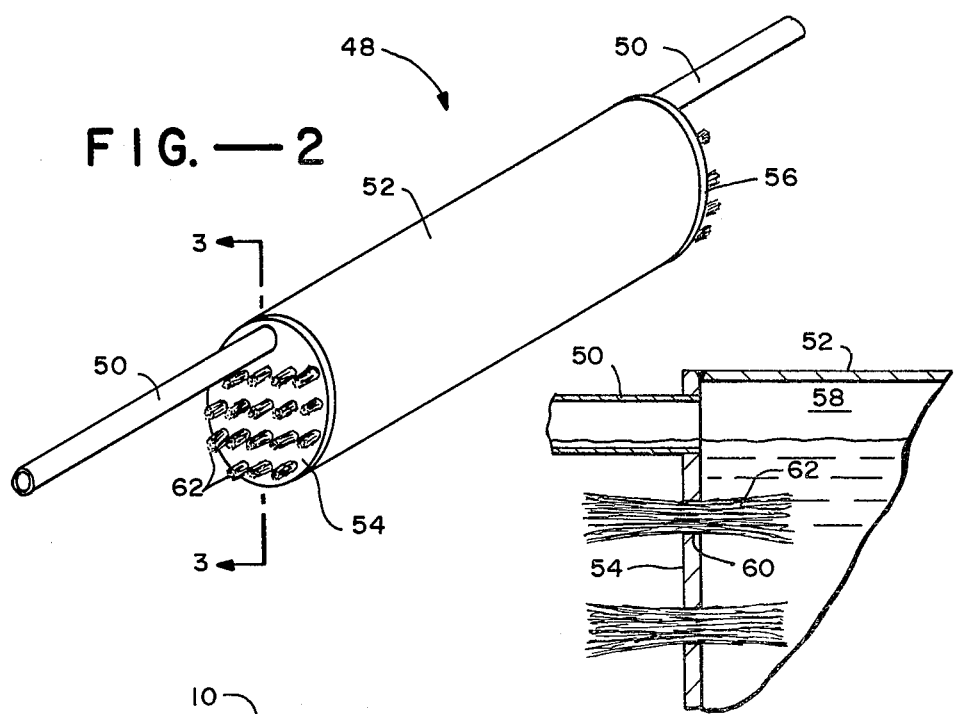
FIG.—2
FIG.—3
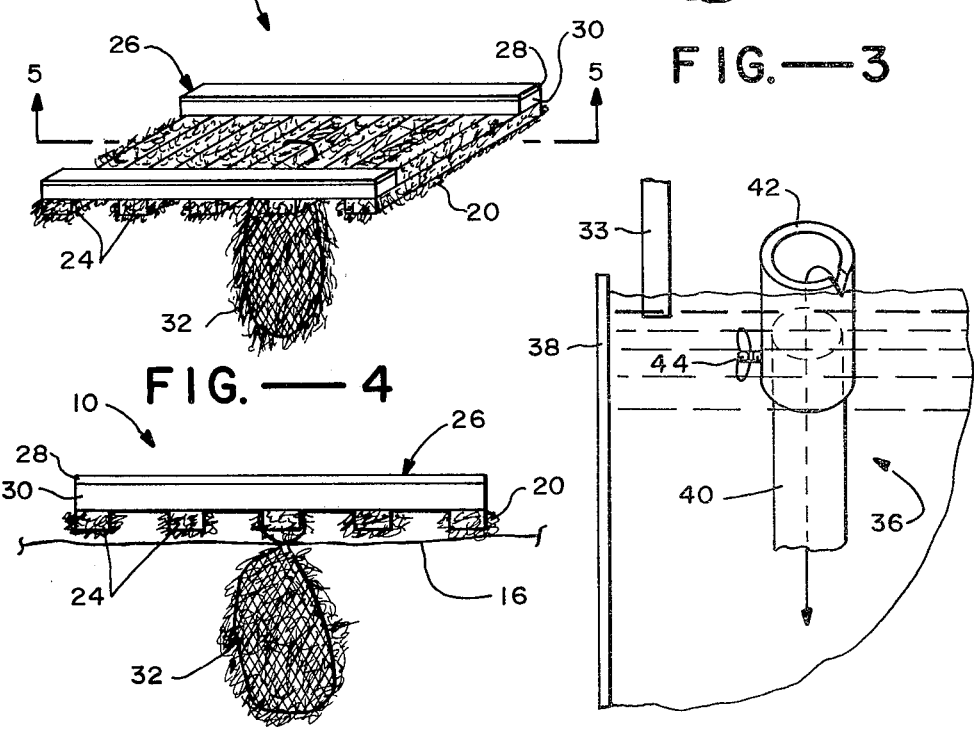
FIG.—4
FIG.—5
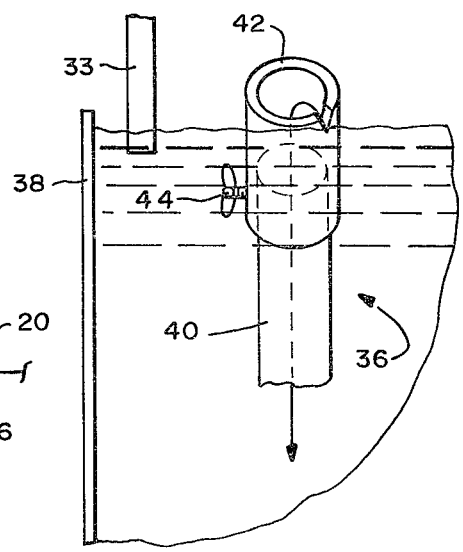
FIG.—6

PROCESS AND SYSTEM FOR PURIFYING WATER

BACKGROUND OF THE INVENTION

The invention relates to a system for reducing the biochemical oxygen demand and suspended solids levels in an impure water volume and, specifically, to such a system which employ bark fibers.

Many sources of impure water require treatment to meet the increasingly strict requirements of various government agencies. By way of example, managed marshlands have been employed for further treatment of municipal or industrial waste waters. Such systems benefit wild life and man while minimizing potentially destructive vectors. One problem in such systems is the rapid increases in plant growth brought about by excessive nutrient deposition (eutrophication) in small bodies of water or peripheral portions of large bodies of water, through run-off of soil fertilizers and discharge of such municipal or industrial waste waters, can result in "blooms" of aquatic algae and a rapid disruption of the normal trophic balance between algae and algal feeders. Such increases in algae do not pass normally into the food chain as most fish and some lower forms of animal life cannot feed on algae. When such water supplies are designated for human consumption, excessive amounts of algae can produce disagreeable odors and "fishy" tastes as well as clogging of filtration machinery.

A particularly effective ecological system for controlling such marshlands is described in my U.S. Pat. No. 4,086,161. Briefly summarized, the system makes use of clusters of substantially individualized bark fibers positioned in the upper relatively oxygen-rich zones of the water body which attract and hold excessive nutrient deposits in the form of colloidal wastes and aquatic algae produced by the same while providing a safe habitat for algae predators in the form of minute animal organisms. The bark fiber clusters serve to prevent disruption in the trophic balance.

While the aforementioned marsh system is highly effective as an ecological system, when liquid is withdrawn from the body of water, it may include zooplankton and invertebrates which could exceed the requirements of such government agencies as the Environmental Protection Agency and various state water quality control boards. In addition, such organisms could cause plugging problems if the effluent were to be further processed through ion exchange or reverse osmosis methods, as for drinking water use.

Thus, it is desirable to provide a treatment system particularly adapted for the further treatment of impure water from a source such as the aforementioned controlled water bodies to reduce its biochemical oxygen demand and suspended solids level and eutrophic chemicals such as nitrogen, phosphorous and dissolved carbon dioxide.

SUMMARY OF THE INVENTION AND OBJECTS

In accordance with the invention, a process and system is provided for reducing the biochemical oxygen demand and suspended solids level in a volume of impure water. The basic building block for the treatment system is a container with opposed spaced-apart end walls which defines a chamber in which the impure water is treated. Inlet and outlet lines are coupled respectively to the end walls. The container also includes multiple spaced-apart holes preferably in the end walls through which clusters of individualized bark fibers project. The inlet and outlet lines are disposed at the upper level of the containers so that the water fills the containers by gravity before exiting.

An enclosed circuit, formed by a number of the above containers interconnected by water flow lines, is buried underground in soil. The influent water to be purified passes in series through the chain. The bark fibers serve to attract and hold nutrient deposition in the water in the form of colloidal wastes, single-celled bacteria, phytoplankton and the like while at the same time providing a safe habitat for minute animal organisms capable of feeding thereupon. This results in the formation of clarified water, a portion of which may pass through the capillary system provided by the bark clusters into the surrounding soil.

The foregoing enclosed treatment circuit is particularly effective for treating the effluent from an ecological system for open bodies of water such as described in the aforementioned U.S. Pat. No. 4,086,161. Thus, effluent from this system to be converted to drinking water or to be otherwise discharged is effectively further treated by the aforementioned system. Treatment in the open body of water will be referred to herein as the "flotation circuit" in contrast to the "underground circuit" set forth above. The combination of the two circuits is particularly beneficial in a combined overall system for purifying water. The principle of attraction of colloidal waste to bark fibers, particularly redwood bark fibers, is disclosed in my U.S. Pat. No. 3,238,124. This principle is effectively utilized in the present invention.

It is a general object of the invention to provide a process and system for reducing the biochemical oxygen demand and suspended solids levels of a volume of impure water in an enclosed circuit.

It is a particular object of the invention to provide a system of the foregoing type which is aesthetically pleasing as it is buried underground and not visible on the surface.

Another object of the invention is to provide a system of the foregoing type capable of further treating the effluent from a controlled ecology open body of water.

A particular object of the invention is to provide such a system disposed in a root active area of the soil and which provides root access into the interior of the enclosed system to increase the efficiency of purification.

It is another object of the invention to provide a capillary path for purified water within the system into the surrounding soil to lower the volume of ultimate discharge.

A further object of the invention is to provide a system of the above character that does not require complicated procedures or equipment and which is readily adaptable to rural environments and which provides a wild life habitat area consisting of a pond, marshland and trees.

Additional objects and features of the invention will be apparent from the following description taken in conjunction with the accompanying drawings.

BRIEF DESCRIPTION OF THE DRAWINGS

FIG. 1 is a schematic representation of one system of apparatus useful in carrying out the method of the present invention.

FIG. 2 is a perspective expanded view of one container in the series of containers of FIG. 1 illustrating the bark plugs.

FIG. 3 is an expanded sectional view of an end wall of the container of FIG. 2 taken along line 3—3.

FIG. 4 is an expanded perspective view of the flotation unit of the type set forth in FIG. 1.

FIG. 5 is a sectional view along line 5—5 of FIG. 4.

FIG. 6 is a schematic view of suitable adjustable flow control valve in accordance with the invention.

DETAILED DESCRIPTION OF THE PREFERRED EMBODIMENT

The present invention is best understood by first describing a preferred system for carrying out the method.

Referring to the drawings, a number of float units 10 are illustrated in position on the surface of a body of water 12 between spaced-apart float members 14 retained by lines or stringers 16 which can be secured to the float members by any suitable means such as air-driven staples. The mode of retention and flotation may be of the type set forth in my aforementioned U.S. Pat. No. 4,086,161.

Influent impure water is directed into body of water 12 via line 18. In a particularly useful system, the influent comprises wastewater from an industrial or municipal source which has been at least partially treated upstream of line 18.

The function of the floating ecological system in body of water 12 is generally the same as that described in U.S. Pat. No. 4,086,161, incorporated at this point by reference. Briefly summarized, clusters of substantially individualized bark fibers are carried by float units 10 to provide a convenient resting place for various types of algae predators such as rotifers, snails, zooplankton and like miniature organisms. As particularly illustrated in FIGS. 4 and 5, a profusion of substantially individualized bark fibers 20 are adhered to the flotation units to provide essentially self-contained clusters or units of the bark fibers on the float units. Such clusters of bark fibers provide excellent means for attracting and holding such algae predators in spaces between the bark fibers to provide convenient living and breathing cavities for a wide variety of minute organisms capable of converting algae and other pollutants in the body of water 12 into carbon dioxide and energy.

Referring to FIGS. 4 and 5, specific float units are illustrated in which the flotation framework includes multiple spaced apart cross slats 24 suitably formed of wood or the like, adhered to parallel float beams 26 by adhesive or the like. In a preferred embodiment, beam 26 includes an upper relatively thin protective surface layer 28 formed of wood, plastic or the like over an overlying thick layer 30 of light but structurally weak material such as polystyrene foam or the like. As illustrated, the profusion of bark fibers are adhered to the wood by a suitable adhesive material such as a layer of coal or wood tar. Thus, the fibers may be applied while the tar is in a soft or molten state following which the bark fibers are applied and adhered to the slats so that individual fibers are positioned in desired spatial relationship to provide numerous openings and cavities. The bark fibers are preferably redwood bark fibers which have been processed by bending and rolling shear stresses followed by shredding and dust separation operations to provide relatively short individualized fibers as described, for example, in U.S. Pat No. 3,238,124.

Referring again to FIGS. 4 and 5, perforate enclosures 32 may be suspended from float units 10 to provide additional breathing and living area for the algae predators. Commercially available bags of expandable polyethylene mesh may be used for this purpose including a drawstring or other upper closure of the bag through which retaining string 16 may pass for securing to the float units. Individualized bark fibers may be used in the enclosures. However, as described in U.S. Pat. No. 3,238,124, strips of processed bark include large surface areas and are preferably used for this purpose.

The advantage of this floating ecological system is fully described in U.S. Pat. No. 4,086,161. Briefly described, excess colloidal waste particles, single-celled bacteria and algae are attracted to and held by the bark fiber float units 10. Minute animal feeders grow in the bark fibers and promote a trophic balance in the body of water. A detailed discussion of the function of such floating units is set forth in the last-named patent, incorporated at this point by reference. As set forth above, for convenience, this system will be referred to as the "flotation circuit" which is used in combination with the underground system to be described more fully hereinafter.

Referring again to FIG. 1, water which has been partially treated in the floating system is removed from a portion of the body of water remote or spaced apart from influent line 18 via line 33. This prevents short circuiting. In a typical installation, water will be pumped via pump 34 to a control valve 36, suitably of a type illustrated in FIG. 6. The water in line 33 is pumped to a contained volume tank 38 from which the water is withdrawn by overflow into stand-pipe 40. The mode of adjustment is via a cylindrical sleeve 42 adjustable by turn-screw 44 and including a V-notch through which water overflows under the desired head pressure. Thus, the head pressure is reduced when sleeve 42 is slid downwardly and increased when it is slid upwardly. Other valve means may also be employed to accomplish this objective.

As illustrated, the liquid from valve 36 is split by a suitable stream splitter, not shown, into two parallel flow streams for treatment in the underground circuit generally designated 46. Unit 46 comprises a series of containers 48 interconnected by flow lines or pipe sections 50. The first pipe section 50 interconnects valve 36 and the respective paths of the two parallel circuits while subsequent pipe sections 50 interconnect the outlet from one upstream container to the inlet of the next succeeding downstream container. The outlet of the last container 48 of both circuits are connected via pipe sections 50 to valve 53 to be described below.

The basic unit in the underground flow system is container 48. It is suitably of an elongate shape and is preferably including a cylindrical wall 52 disposed in the same general direction as pipe sections 50 to which are mounted end walls 54 and 56 interconnected to pipe sections 50 to provide open communication therebetween. In a preferred embodiment, end walls 54 and 56 are upright and generally perpendicular to cylindrical wall 52 defining therebetween an internal cylindrical chamber wherein water is treated as set forth below. The underground circuit preferably is disposed in a generally horizontal position. To maximize utilization of the container, it is preferable to fill the major portion of the container. This is accomplished by disposing pipe sections 50 in the upper portion near the top of the end walls and permitting each unit in succession to fill with water prior to flow into the next section.

A major feature of the invention is the utilization of bark plugs for water treatment in container 48. In the illustrated embodiment, end walls 54 and 56 include multiple spaced-apart holes 60 through which bark plugs 62 project. It should be understood that the bark plugs may also project through openings in cylindrical wall 52 in addition to or in place of the ones in end walls 54 and 56.

In a specific apparatus, containers 48 may be made by slicing the cylindrical member 52 in the middle with each end injection molded with the holes 60 initially placed. Flanges at the middle may be joined by an adhesive such as plastic cement. The containers are typically plastic cylinders about 12 inches in diameter and 30 inches long with plastic walls about 3/16 inch in thickness. Flow pipes 50 may be formed of the same plastic material and are suitably 2 inches in diameter. The end plates may be about 0.25 inch in thickness with approximately 24 holes for the bark plugs.

The bark plugs serve a number of important functions in the purification system of the present invention. They remove the colloidal material from the impure water to be treated. Assuming such water is from the flotation system, it includes colloidal solids such as zooplankton, some phytoplankton plus snail eggs and other invertebrates such as described at col. 5, lines 43 to col. 6, line 18 of U.S. Pat. No. 4,086,161.

One function of the plugs is to provide a means to attract and hold nutrient deposition in the water to be treated in the form of such colloidal wastes, single-celled bacteria, cytoplankton and the like. Another function is to provide a safe habitat for minute animal organisms capable of feeding thereupon.

A third function of the plugs is the provision of a conduit or channel for forest foliage, roots of trees and the like to grow through the plugs into the interior of container 48 wherein animal life such as small snails thrive. In that regard, it is noted that such snails thrive on smooth plastic surfaces such as of the type from which container 48 are formed. Referring to FIG. 1, a number of trees 51 are illustrated adjacent to the underground circuit.

The bark plugs are porous with a structure similar to the surrounding soil. Thus, they provide a capillary system for transmission of water clarified as set out above into the soil. Thus, it is an improvement over conventional leach line systems which customarily transmit water through a rock bed into the soil. The present system is more efficient because the water flows in a capillary system which has an interface of some depth rather than in a film covered interface between rock and soil.

The bark plugs 62 are preferably of a type which provide the foregoing functions. Suitably, they may comprise bundles of strips of bark or bark fibers, preferably redwood back, as more fully described at columns 5 and 6 of U.S. Pat. No. 3,700,590. For maximum use of the bark fibers and ready securing in opening 60, the fibers preferably project a substantial distance to both sides of container end walls 54 and 56 to extend a distance of, say, several inches on both sides.

In the illustrated embodiment, the water is purified in two parallel paths in the underground circuit. It should be understood that a single path, two, three or more paths may be employed in a given instance. The advantage of splitting the stream is that it increases the capacity of the system for a given distance.

In a preferred embodiment, the flow of water in the underground circuit from valve 50 to valve 53 is under the influence of gravity say with a slope of about 2 inches in 10 feet. Thus, the bank around the body of water 12 may be contoured for gravity flow through containers 48. As the water enters each container and through each successive unit, it is prevented from rising to the surface because it is contained within the flow system. Each container fills before the water flows into the next succeeding container throughout the system. Thus, during filling, the water interface contacts the fibers of plugs 62 for a maximum contact and thus treatment. If such gravity flow is not feasible in a given system, the total impetus to movement may be provided by pumping alone.

Referring again to FIG. 1, the effluent from the system flows out line 64, at a purity suitable to meet applicable government standards. In addition, the level of colloidal solids may be reduced to a sufficient extent to eliminate plugging problems if the effluent is to be further processed through ion exchange or reverse osmosis methods. As illustrated, a portion of the effluent in valve or flow regulator 53 may be recycled through lines 66 for further treatment in the flotation circuit. Flow regulator 53 may be of the same type as regulator 36.

Soil is characterized by different properties at different levels below the surface. In accordance with one mode of description, the top layer of leaf litter or mold extends up to about 8 inches and is designated zone A; the next layer of active root growth extends generally between about 8 to 12 inches and is designated zone B; the next layer of clay and inert soils extending for about 1 to 20 feet is designated zone C; while the lower layer of rocks is designated zone D. It is preferable to dispose at least a portion of the underground circuit in the zone B horizon of the soil. Thus, the roots of trees and grasses readily enter container 48 for absorption of the nutrients directly. In addition, it has been established that in this level of the soil, viruses and bacteria are also removed. One of the preferred species of trees to assist in the present process is the coast redwood. A marsh forest including such trees provides an attractive and productive effluent treatment system relatively free of nuisance vectors such as flies, gnats, mosquitos and odor. Wildlife generally prefer an environment composed of a mixture of grass, woodlands and water of the type set forth herein.

As set out above, the level of suspended solids and biochemical oxygen demand is substantially reduced in accordance with the underground circuit of the present invention. While a preferred system is in combination with the flotation circuit, it should be understood that the system is broadly applicable to use alone or in combination with other prior treatment systems of the open water body type or otherwise. Also, it could be used as an improved leach field in a dead-end, one-way system without recycle to a body of water.

In a generalized example, wastewater as from a secondary treatment system is directed via influent line 18 into water body 12 for treatment by the flotation system. A typical water to be treated is a wastewater from a secondary sewage treatment system with a biological oxygen demand of 30 ppm, a suspended solids content of 30 ppm, a coliform count of 23/100 ml, a settlable solids measure of 1 ml/l, and a chlorine residue of 2 ppm.

In the flotation circuit, the water is treated by contact with the bark fibers as set forth above. In addition, conventional aeration may be provided by means of a floating rotating aerator of the type commercially available from under the trademark "Aero Surf" from Autotrol Corporation. At a remote portion of the body of water, after treatment, water is removed by pump 34, suitably as a low head submersible pump which lifts the water to flow regulator 36 and a splitter, not shown, into one or more underground circuits of multiple pipes by means of adjustable weirs. The water pumped in line 32 from the flotation system typically has about 4-7 ppm of dissolved oxygen, a variable number of algae cells and a wide variety of zooplankton and invertebrates.

In the illustrated system, the underground circuit includes two separate parallel lines each with 12 connected containers spaced by pipe sections about 10 feet long. The water is split about equally between each of the two lines to flow regulator 53 where the flow is optionally split with about ⅔ proceeding back to the flotation unit and ⅓ to discharge in line 64. While the separate lines are generally horizontal, they preferably slope slightly downwardly say at 2 inches per 10 feet to provide gravity flow to the system. In this manner, each successive container is filled under gravity flow prior to passage into the next successive container. A typical flow rate through the system is on the order of 5 to 10 gallons per minute.

An advantage of the underground circuit is that the lines are submerged in the soil and so no light reaches the algae which dies and is consumed by the zooplankton and invertebrates. By adjustment of the system, sufficient dissolved oxygen is present so that the organisms thrive consuming not only the algae but each other progressively up the food chain. Hence, the water entering the final flow regulator 53 is substantially reduced in biochemical oxygen demand and suspended solids.

Some of the water in the individual containers is removed from them by capillary action through the bark fibers. This clarified water enters the upper soil layer where roots and soil fauna remove some of the water and remove the nutrients viruses and bacteria from the water. This purified water then can flow back into the body of water 12 or to percolate to the aquifer.

What is claimed is:

1. Apparatus for reducing the biochemical oxygen demand and suspended solids level in a volume of impure water, comprising a container disposed underground in a soil environment forming a chamber for treating the impure water and including opposed spaced-apart end walls, inlet and outlet water lines coupled respectively to said end walls and communicating with said chamber, said container defining multiple spaced-apart holes extending through the container, and bark plugs retained in said container holes and projecting therethrough.

2. The apparatus of claim 1 in which said container is an elongate generally cylindrical shape.

3. The apparatus of claim 1 in which said container holes are disposed in said end walls.

4. The apparatus of claim 1 including a plurality of said containers interconnected in series by a plurality of said water lines and forming, in composite, an enclosed treatment circuit.

5. The apparatus of claim 4 in which said treatment circuit is disposed underground in a soil environment.

6. The apparatus of claim 4 in which the end walls of said containers are generally upright and the water lines are connected to the upper portion of respective end walls on the downstream side thereof so that during water passage, said container is substantially filled with water.

7. The apparatus of claim 4 together with means for recycling a portion of the water treated in said treatment circuit for further treatment.

8. The apparatus of claim 4 including at least two of said treatment circuits and means for splitting the influent impure water into parallel streams for passage through said two treatment circuits.

9. The apparatus of claim 1 in which said bark plugs comprise bundles of bark fibers projecting the entire distance between openings in said opposed end walls and also projecting externally of both end walls.

10. A system for reducing the biochemical oxygen demand and suspended solids level in a volume of impure water comprising a first water treatment circuit connected in series with a second water treatment circuit disposed underground and surrounded by soil, said first treatment circuit comprising a plurality of float units floating in secured positions in a body of water, bark fibers carried by said float units for promoting a trophic balance between minute animal feeders and excessive colloidal nutrient depositions in said body of water, and an influent line for impure water into said body of water; said second treatment circuit comprising a plurality of water containers each defining independent chambers for treating the impure water in series, lines interconnecting said containers, said containers defining multiple openings adapted for carrying bark plugs which are adapted to remove and consume colloidal solids in the impure water, bark plugs disposed in said openings, conduit means providing a water path between said body of water and said interconnecting lines of said containers and means associated with said conduit means for directing water treated in said body of water into said second treatment circuit.

11. A process for reducing the biochemical oxygen demand and suspended solids level in a volume of impure water, comprising causing the water to flow in series through an enclosed treatment circuit comprising a plurality of water containers interconnected by water lines, said containers defining holes through which project bark plugs, said water filling the major portion of said chambers to provide substantial residence time, said enclosed treatment circuit being disposed underground and surrounded by soil, said bark plugs functioning as a means to attract and hold nutrient deposition in the form of colloidal wastes, single-celled bacteria cytoplankton and the like while at the same time providing a safe habitat for minute animal organisms capable of feeding thereupon, resulting in the formation of clarified water, said bark clusters also providing a capillary system for passage of said thus-formed clarified water into the surrounding soil.

12. The process of claim 11 in which said soil including plants with roots attracted by said bark plugs, said roots growing through the same into the interior of said containers.

13. The process of claim 11 in which said enclosed treatment unit is disposed in the root active zone of the soil.

14. The process of claim 11 including at least two of said enclosed treatment circuits and in which said impure water is split into two streams which flows through said two enclosed treatment circuits in parallel.

15. The process of claim 11 together with the steps of floating a profusion of individual bark fibers on self-contained flotation units in a body of water and passing said water stream in a circuit through a portion of said body of water past said flotation units, said last-named step being performed in series with treatment in said enclosed treatment circuit.

16. The process of claim 15 in which said water is passed through said body of water portion prior to passage into said enclosed treatment circuit.

17. The process of claim 16 in which a portion of the treated water effluent from the enclosed treatment circuit is recycled to the body of water.

18. The process of claim 11 in which said containers are disposed at progressively lower levels in the direction of water flow to provide gravity assisted flow which causes upstream containers to be filled with water prior to passage to the next succeeding downstream container.

* * * * *